US008821005B2

(12) United States Patent
He

(10) Patent No.: US 8,821,005 B2
(45) Date of Patent: Sep. 2, 2014

(54) EDGE-LIT BACKLIGHT MODEL

(75) Inventor: Hu He, Shenzhen (CN)

(73) Assignee: Shenzhen China Star Optoelectronics Technology Co., Ltd., Shenzhen (CN)

(*) Notice: Subject to any disclaimer, the term of this patent is extended or adjusted under 35 U.S.C. 154(b) by 185 days.

(21) Appl. No.: 13/640,744

(22) PCT Filed: Sep. 7, 2012

(86) PCT No.: PCT/CN2012/081142
§ 371 (c)(1),
(2), (4) Date: Oct. 12, 2012

(87) PCT Pub. No.: WO2014/029141
PCT Pub. Date: Feb. 27, 2014

(65) Prior Publication Data
US 2014/0056030 A1    Feb. 27, 2014

(30) Foreign Application Priority Data
Aug. 22, 2012  (CN) .......................... 2012 1 0300743

(51) Int. Cl.
*F21V 7/04* (2006.01)

(52) U.S. Cl.
CPC .............. *G02B 6/009* (2013.01); *G02B 6/0085* (2013.01)
USPC .............................. 362/634; 362/633; 349/60

(58) Field of Classification Search
CPC ............ F21V 2008/006; G02B 6/0085; G02B 6/0086; G02B 6/0088; G02B 6/009
USPC ........................ 362/612, 630–634; 349/58, 60
See application file for complete search history.

(56) References Cited

U.S. PATENT DOCUMENTS

2014/0022487 A1* 1/2014 Wang et al. .................... 349/58

* cited by examiner

*Primary Examiner* — Jason Moon Han

(57) ABSTRACT

The present invention relates to an edge-lit backlight model, which comprises a back board, a heat sink arranged on the back board, and a light bar fixed on the heat sink, a light guiding plate is arranged above the back board, a plurality of back board clips are arranged on the back board and the heat sink is held under the back board clips; a elastic element is arranged between the back board and the heat sink and the elastic element applies horizontal elastic force to the heat sink towards the back board, so that the heat sink is immovable along its width direction. The edge-lit backlight model can prevent the light guiding plate from being bent and guarantee the efficiency of light coupling.

10 Claims, 8 Drawing Sheets

EDGE-LIT BACKLIGHT MODEL

FIELD OF THE INVENTION

The present invention relates to a backlight model, and particularly to an edge-lit backlight model.

BACKGROUND OF THE INVENTION

FIG. 1A is an exploded view of an edge-lit backlight model 100 in the prior art. As shown in FIG. 1, the edge-lit backlight model 100 comprises a back board 101 and a heat sink 103 attached to the back board by screws 102. An LED light bar 104 is attached to, and perpendicular with the heat sink 103. A plurality of LED 105 is arranged on the LED light bar 104.

FIG. 1B is a cross-section view of the edge-lit backlight model in the prior art. As shown in FIG. 1 and FIG. 2, the edge-lit backlight model 100 further comprises a light guiding plate 106. A locating pole 107 is attached to, and perpendicular with the back board 101. The light from the LED 105 is projected onto the panel (not shown) after passing through and effected by the light guiding plate 106.

In the edge-lit backlight model 100, the distance between the LED 105 and the light guiding plate 106 will influence the efficiency of light coupling by the LED 105 to the light guiding plate 106, the shorter the distance, the higher the efficiency of light coupling and the efficiency of the whole edge-lit backlight model 100 will be improved.

FIG. 2 is a cross-section view of the edge-lit backlight model 100 in the prior art, wherein the light guiding plate 106 is expanded. As shown in FIG. 2, when the operating environment of the edge-lit backlight model 100 is changed, especially the light guiding plate 106 is expanded for being heated or being moistened, the light guiding plate 106 may contact with the LED 105 due to expansion and deformation. There are two risks resulted from the deformation, the first, LED 105 will be damaged by impact and press of the light guiding plate 106; the second, the light guiding plate 106 is fixed by the locating pole 107 and can not extend along the width direction, which will result that the light guiding plate 106 is bent.

An adequate moving space is usually pre-arranged and the distance between the light guiding plate 106 and the LED 105 is largened, so as to prevent the light guiding plate 106 from being bent due to heated or moistened, but the light coupling distance will be largened and the efficiency of backlight will be influenced significantly.

SUMMARY OF THE INVENTION

The technical problem to be solved by the present invention is to provide an edge-lit backlight model which can prevent the light guiding plate from being bent and guarantee the efficiency of light coupling, aiming at the edge-lit backlight model in the prior art can not prevent the light guiding plate from being bent and take the efficiency of light coupling into consider at the same time.

The following technical solution is provided in the present invention to solve the technical problem: an edge-lit backlight model is provided, which comprises a back board, a heat sink arranged on the back board, and a light bar fixed on the heat sink, a light guiding plate is arranged above the back board, a plurality of back board clips are arranged on the back board and the heat sink is held under the back board clips; a elastic element is arranged between the back board and the heat sink and the elastic element applies horizontal elastic force to the heat sink towards the back board, so that the heat sink is immovable along its width direction.

The edge-lit backlight model as mentioned in the present invention, elastic snaps are fixed on the back board, the elastic snaps are located on the two ends of the heat sink and lock the heat sink, so that the heat sink is immovable along its length direction.

The edge-lit backlight model as mentioned in the present invention, the back board comprises a back board body and a side board of the back board which is arranged on the edge of the back board body; the heat sink comprises a heat sink body and a side board of the heat sink which is arranged on the edge of the heat sink body, the elastic element is arranged between the side board of the back board and the side board of the heat sink.

The edge-lit backlight model as mentioned in the present invention, the heat sink body comprises a first part and a second part, wherein the thickness of the first part is less than the second part, and the first part is held under the back board clips.

The edge-lit backlight model as mentioned in the present invention, a protuberant plane is set on the back board, and the back board clips are located between the side board of the back board and the protuberant plane.

The edge-lit backlight model as mentioned in the present invention, top surfaces of the back board clips are lower than a top surface of the second part of the heat sink, and lower than a top surface of the protuberant plane of the back board.

The edge-lit backlight model as mentioned in the present invention, the second part is snapped and positioned by the elastic snaps.

The edge-lit backlight model as mentioned in the present invention, the back board clips and the back board are molded in one piece.

The edge-lit backlight model as mentioned in the present invention, the back board clips are additional clips attached to the back board.

The edge-lit backlight model as mentioned in the present invention, the back board clip comprises a curve part and a plane part connected with the curve part.

When implementing the edge-lit backlight model of the present invention, the following advantageous effect can be achieved: the fixing means of the heat sink is simple, and a extending space can be provided for the light guide plate when the light guide plate is expanded for being heated or being moistened, which can prevent bend resulted from interference between the elements, and prevent the LEDs from damage resulted from over impact and press on the LEDs. This structure does not have to largen the distance between the light guiding plate and the LEDs, the light coupling distance can be kept and the efficiency of light coupling can be improved.

BRIEF DESCRIPTION OF THE DRAWINGS

The present invention will be described in detail with reference to the accompanying drawings and embodiments, in the accompanying drawings.

DETAILED DESCRIPTION OF THE PREFERRED EMBODIMENT

The objective, technical scheme and advantages of the present invention will be more apparent from the following detailed description of the present invention with reference to the accompanying drawings and embodiments. It should be understand that the embodiment is described herein to illustrate the present invention, and is not limitation.

Figure 1A:
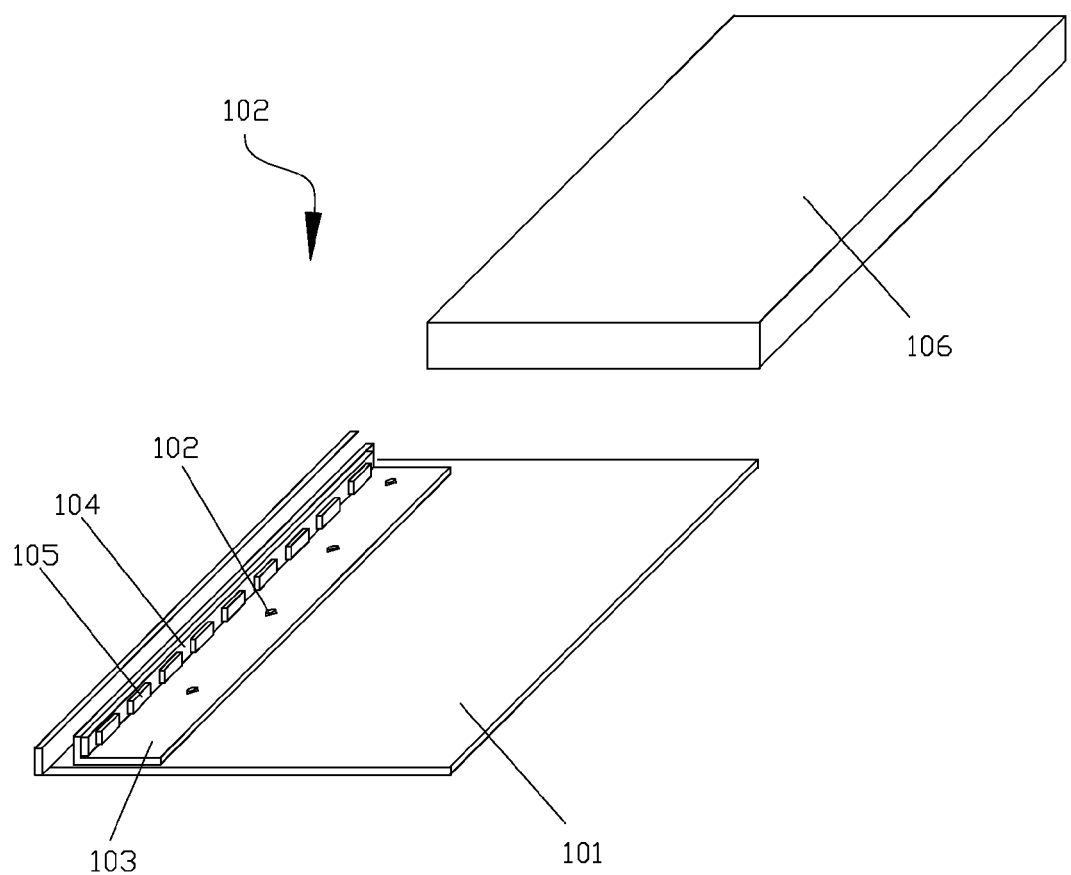
FIG. 1A is a exploded view of an edge-lit backlight model in the prior art.
Figure 1B:
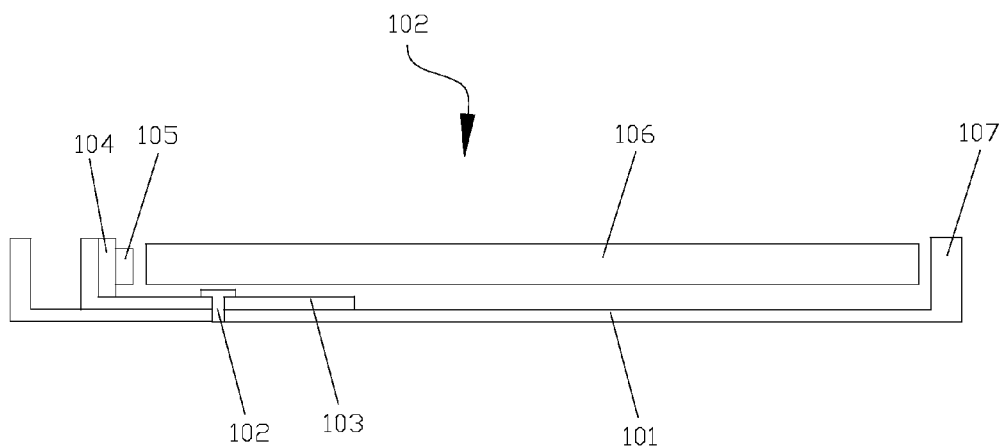
FIG. 1B is a cross-section view of the edge-lit backlight model in the prior art.
Figure 2:
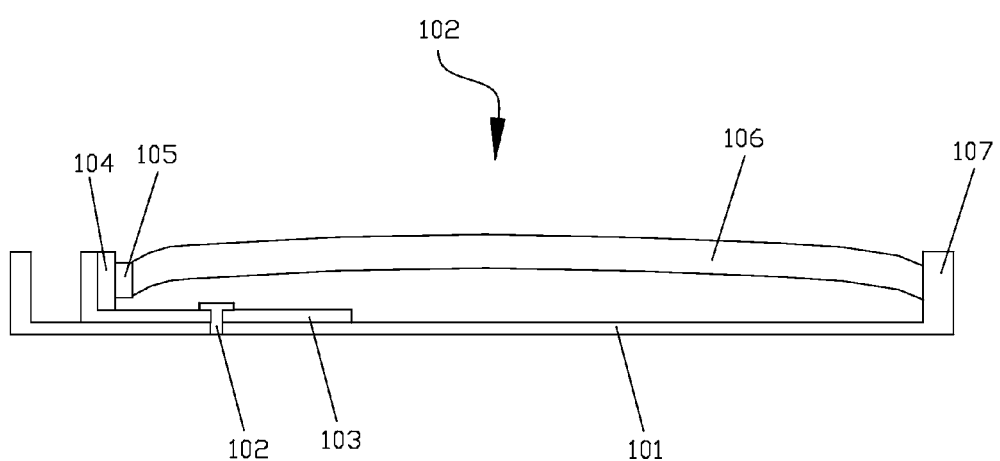
FIG. 2 is a cross-section view of the edge-lit backlight model in the prior art, wherein the light guiding plate is expanded.
Figure 3:
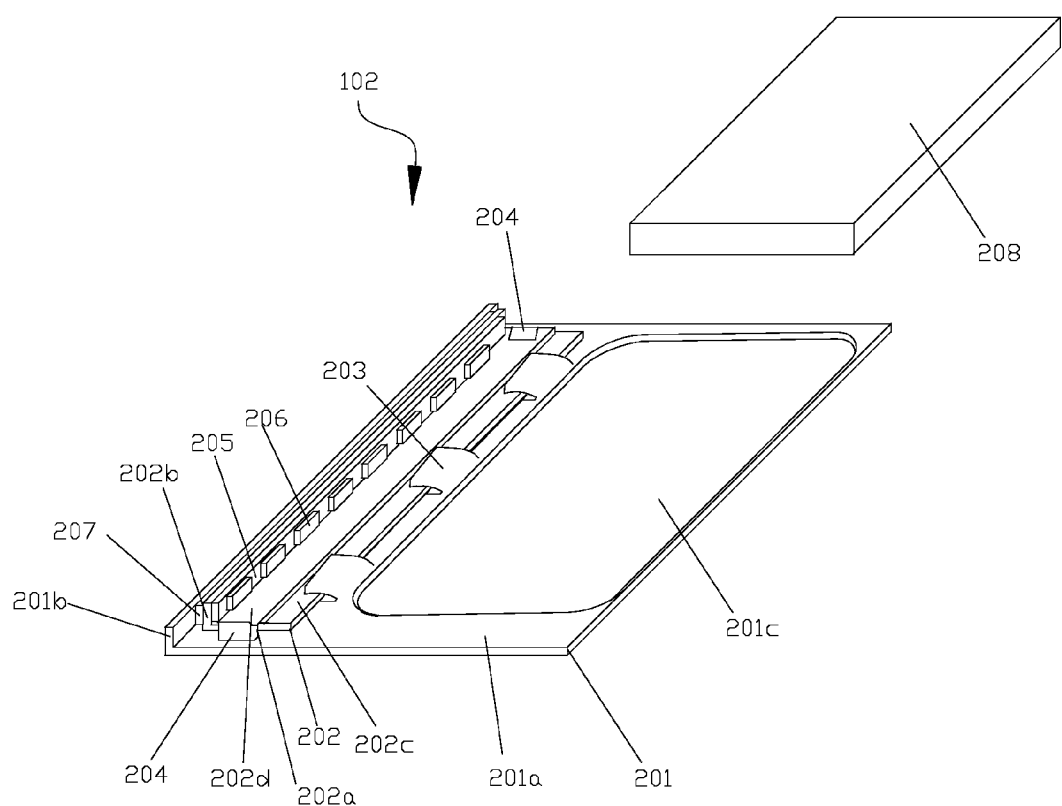
FIG. 3 is an exploded view of an edge-lit backlight model according to the present invention.
Figure 4:
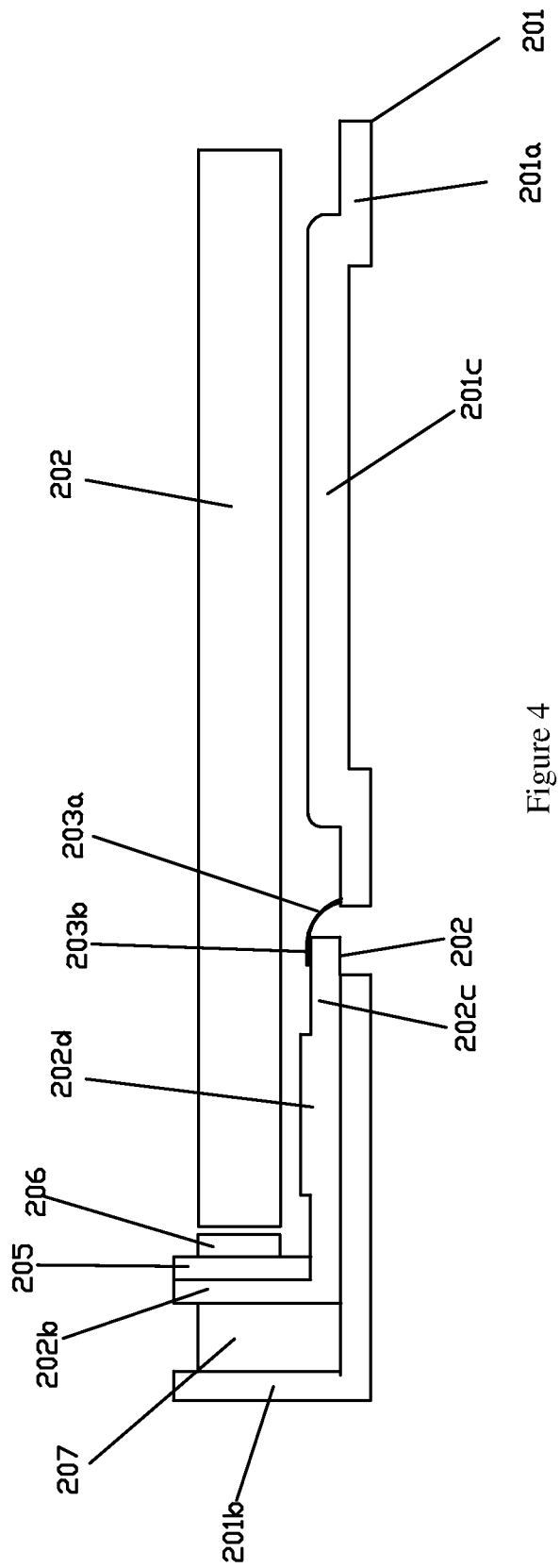
FIG. 4 is a cross-section view of the edge-lit backlight model according to the present invention.

FIG. 3 is an exploded view of an edge-lit backlight model according to the present invention. FIG. 4 is a cross-section view of the edge-lit backlight model according to the present invention. As shown in FIGS. 3 and 4, an edge-lit backlight model 200 according to the present invention comprises a back board 201 and a heat sink 202 arranged on the back board 201.

The back board 201 is a plate approximately, comprises a back board body 201a and a side board of the back board 201b which is arranged on the edge of the back board body 201a, wherein the side board of the back board 201b is perpendicular to the back board body 201a. A plurality of back board clips 203 are arranged on the back board 201a along a direction parallel to the length direction of the side board of the back board 201b, the back board clip 203 comprises a curve part 203a connected with the body 201a and a plane part connected with the curve part 203a (please refer to FIG. 4). A protuberant plane 201c is arranged on the back board 201, wherein the back board clip 203 is between the side board of the back board 201b and the protuberant plane 201c.

The heat sink 202 extends along a direction parallel to the length direction of the back board 201b, and comprises a heat sink body 202a and a side board of the heat sink 202b which is arranged on the edge of the heat sink body 202a. The heat sink body 202a comprises a first part 202c and a second part 202d with different thicknesses, wherein the thickness of the first part 202c is less than that of the second part 202d. The first part 202c is held under the back board clips 203. Elastic snaps 204 are arranged on the back board 201. The elastic snaps 204 may be made of plastic, and are fixed on the back board by screws. The elastic snaps 204 are located on the two ends of the second part 202d of the heat sink 202, and two ends of the second part 202d of the heat sink 202 is locked by the elastic snaps 204 and is immovable.

Figure 5A:
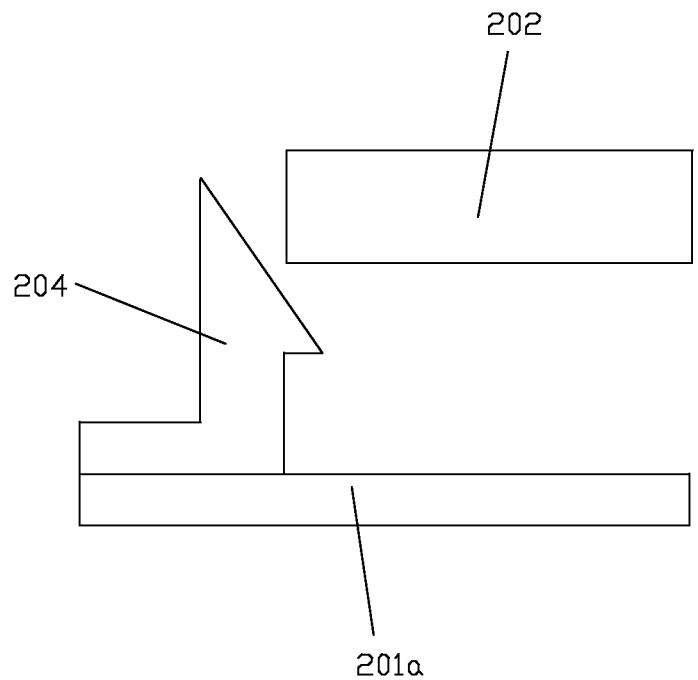
FIG. 5A-5C is a cross-section view showing a back board during assembling with a heat sink according to the present invention.
Figure 5B:
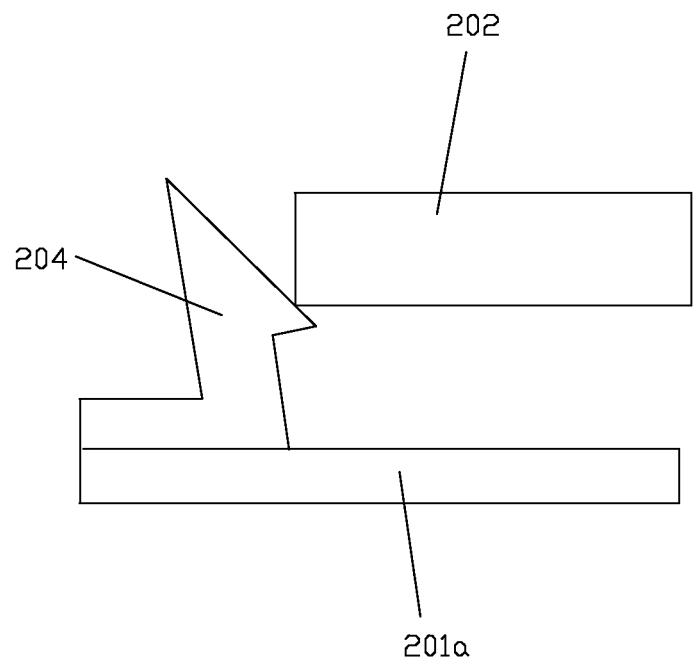
Figure 5C:
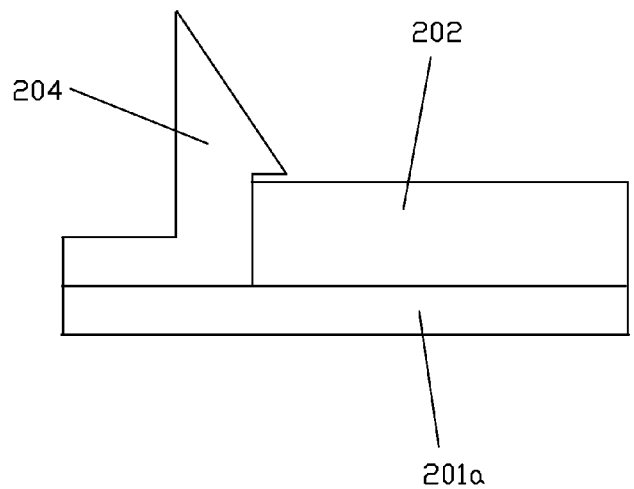
Figure 6:
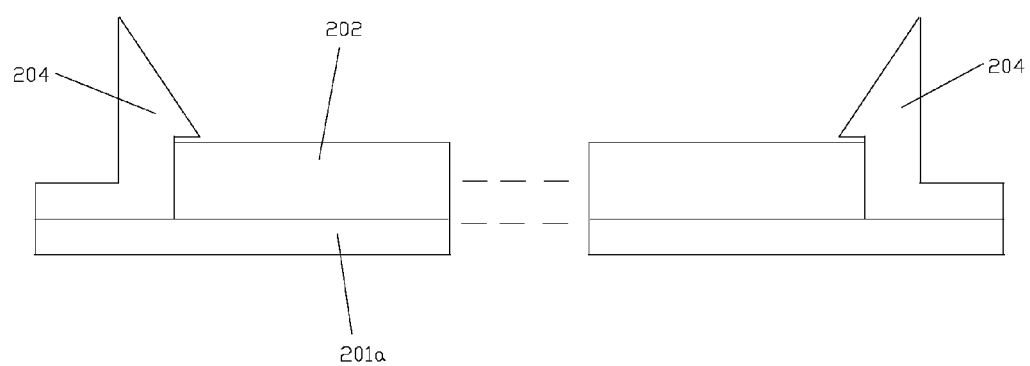
FIG. 6 is a cross-section view showing the back board after assembled with the heat sink according to the present invention.

FIG. 5A-5C is a cross-section view showing a back board during assembling with a heat sink according to the present invention. Refer to FIG. 5A-5C, the first part 202c of the heat sink 202 is inserted into the back board clips 203 and the second part 202d of the heat sink 202 press the elastic snaps 204 so that the elastic snaps 204 are elastically deformed, thereafter, the heat sink 202 snaps into the elastic snaps 204, the elastic snaps 204 come back to its original position and the heat sink 202 is immovable along its length direction. The cross-section view showing the back board after assembled with the heat sink according to the present invention is shown in FIG. 6.

Refer to FIGS. 3 and 4, the edge-lit backlight model 200 further comprises a light bar 205 fixed on the side board of the heat sink 202b, and the light bar 205 extends along the direction parallel to the length direction of the side board 201b. A plurality of LEDs 206 are arranged on the light bar 205.

the edge-lit backlight model 200 further comprises a elastic element 207 arranged between the back board 201b and the heat sink 202b, and a light guiding plate 208 arranged above the back board 101. The elastic element 207 may be, for example, foam, compression spring, etc. When the first part 202c of the heat sink 202 is inserted into the back board clips 203 and two ends of the heat sink 202 is snapped by the elastic snaps 204, the elastic element 207 is inserted between the side board of the back board 201b and the side board of the heat sink 202b.

The edge of the light guiding plate 208 faces with the LEDs 206 and keeps a predetermined distance from the LEDs 206, and the light emitted by the LEDs 206 is coupled into the light guiding plate 208.

Figure 7:
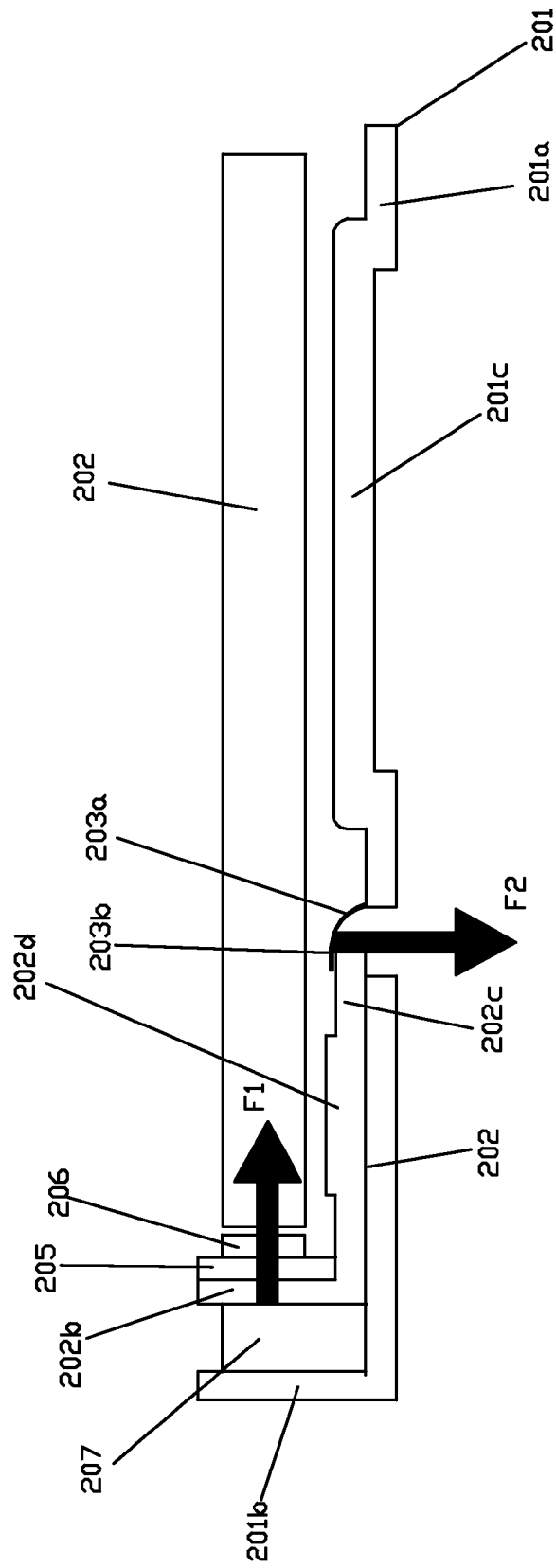
FIG. 7 is a cross-section view of the edge-lit backlight model after assembled, wherein the stress state of the heat sink is shown.

FIG. 7 is a cross-section view of the edge-lit backlight model after assembled. As shown in FIG. 7, the elastic element 207 has a width X in its original state, the distance between the side board of the back board 201b and the side board of the heat sink 202b is X1, and X1<X. The elastic element 207 is deformed by press and applies a horizontal elastic force F1 to the side board of the heat sink 202b towards the back board clips 203, so that the heat sink 202 is immovable along its width direction. At the same time, the back board clips 203 apply a pressing force F2 to the heat sink 202. The heat sink 202 bears a resultant force adown, so that the heat sink 202 joints with the back board 201 tightly.

Furthermore, top surfaces of the back board clips 203 are lower than a top surface of the second part 202d of the heat sink 202, and lower than a top surface of the protuberant plane 201c of the back board 201, this position relationship can prevent the board clips 201 from being protuberant and prevent the light guiding plate 208 from being interfered.

Figure 8:
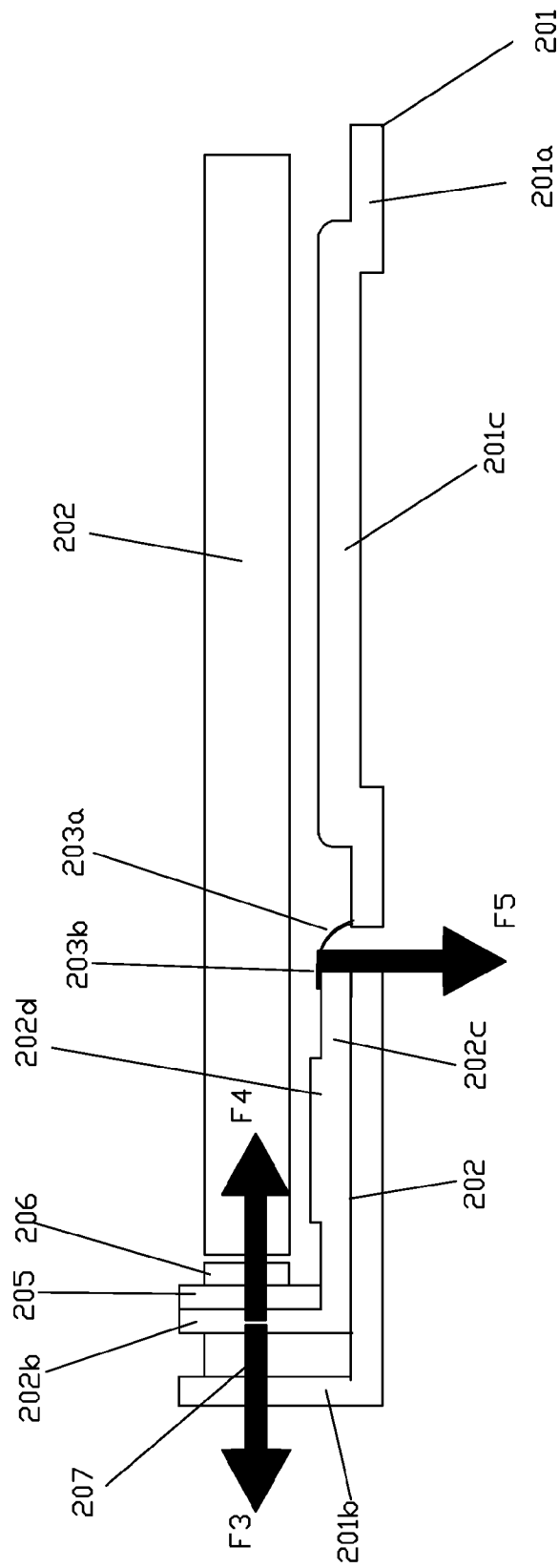
FIG. 8 is a cross-section view of the edge-lit backlight model when the light guiding plate is expanded, wherein the stress state of the heat sink is shown.

FIG. 8 is a cross-section view of the edge-lit backlight model 200 when the light guiding plate 208 is expanded, wherein the stress state of the heat sink 202 is shown. As shown in FIG. 8, when the light guiding plate 208 is expanded for being heated or being moistened, the light guiding plate 208 will press against the light bar 205, and applies a thrust force F3 to the heat sink 202 via the light bar 205. Here, the heat sink 202 will move towards the side board of the back board 201b, and the elastic element 207 is further compressed to a width X2, wherein X2<X1. The elastic element 207 applies an elastic force F4 to the heat sink 202, besides that, the back board clips 203 apply a pressing force F5 to the heat sink 202. The resultant force of the three forces is downwards; in this case, the light guiding plate 208 has spaces for expanding, and the heat sink 202 still joints with the back board 201 tightly.

When the condition of expansion for being heated or being moistened does not exist, the light guiding plate 208 recovers to its original state, and the thrust force on the heat sink 202 is dismissed. The elastic element 207 recovers to the width X1, and the stress state is the same with that in FIG. 7.

It is should be noted that light entering model of the LEDs 206 may be light entering from one edge, light entering from two edges, or light entering from multi-edges. Furthermore, the back board clips 203 and the back board 201 may be molded of the same material in one piece, or may be additional clips and be attached to the back board 201 by screws, or jointing ect, and the back board clips 203 may be two or more. In the figures, the elastic element 207 is shown to be one strip, but the elastic element 207 may comprises several elastic elements spaced from each other. The present invention is not limited to this.

Compared to the prior art, according to the edge-lit backlight model 200 of the present invention, the fixing means of the heat sink 202 is simple, and a extending space can be provided for the light guide plate when the light guide plate 208 is expanded for being heated or being moistened, which can prevent bend resulted from interference between the elements, and prevent the LEDs 206 from damage resulted from over impact and press on the LEDs 206. This structure does not have to largen the distance between the light guiding plate 208 and the LEDs 206, the light coupling distance can be kept and the efficiency of light coupling can be improved.

While the preferred embodiments are described above, but they are not limitation. Any modification, equivalent substitution, and improvement within the spirit and principle should be included in the protecting scope of the present invention.

What is claimed is:

1. An edge-lit backlight model, comprising a back board, a heat sink arranged on the back board, and a light bar fixed on the heat sink, a light guiding plate is arranged above the back board, wherein a plurality of back board clips are arranged on the back board and the heat sink is held under the back board clips; an elastic element is arranged between the back board and the heat sink and the elastic element applies horizontal elastic force to the heat sink towards the back board, so that the heat sink is immovable along its width direction.

2. The edge-lit backlight model as set forth in claim 1, wherein elastic snaps are fixed on the back board, the elastic snaps are located on the two ends of the heat sink and lock the heat sink, so that the heat sink is immovable along its length direction.

3. The edge-lit backlight model as set forth in claim 1, wherein the back board comprises a back board body and a side board of the back board which is arranged on the edge of the back board body; the heat sink comprises a heat sink body and a side board of the heat sink which is arranged on the edge of the heat sink body, the elastic element is arranged between the side board of the back board and the side board of the heat sink.

4. The edge-lit backlight model as set forth in claim 3, wherein the heat sink body comprises a first part and a second part, wherein the thickness of the first part is less than the second part, and the first part is held under the back board clips.

5. The edge-lit backlight model as set forth in claim 4, wherein a protuberant plane is set on the back board, and the back board clips are located between the side board of the back board and the protuberant plane.

6. The edge-lit backlight model as set forth in claim 5, wherein top surfaces of the back board clips are lower than a top surface of the second part of the heat sink, and lower than a top surface of the protuberant plane of the back board.

7. The edge-lit backlight model as set forth in claim 4, wherein the second part is snapped and positioned by elastic snaps.

8. The edge-lit backlight model as set forth in claim 1, wherein the back board clips and the back board are molded in one piece.

9. The edge-lit backlight model as set forth in claim 1, wherein the back board clips are additional clips attached to the back board.

10. The edge-lit backlight model as set forth in claim 1, wherein the back board clip comprises a curve part and a plane part connected with the curve part.

\* \* \* \* \*